April 1, 1958 H. DOELEMAN 2,829,279

BI-STABLE MICROWAVE ABSORPTION CIRCUIT

Filed Nov. 19, 1956 3 Sheets-Sheet 1

INVENTOR.
HENRY DOELEMAN
BY Delmar H. Larsen
AGENT

BI-STABLE MICROWAVE ABSORPTION CIRCUIT

Filed Nov. 19, 1956 3 Sheets-Sheet 2

$f_0$ IS NOMINAL FREQUENCY OF SPECTRAL ABSORPTION LINE.
$f_1$ IS FREQUENCY OF LINE WHEN APPLIED CONTROL FIELD IS LOW, ($E_1$).
$f_2$ IS FREQUENCY OF LINE WHEN APPLIED CONTROL FIELD IS HIGH, ($E_2$).

HENRY DOELEMAN,
INVENTOR.

BY Delmar H. Jansen

AGENT

April 1, 1958 H. DOELEMAN 2,829,279

BI-STABLE MICROWAVE ABSORPTION CIRCUIT

Filed Nov. 19, 1956 3 Sheets-Sheet 3

INVENTOR.
HENRY DOELEMAN
BY
Delman K Hansen
AGENT

United States Patent Office 2,829,279

Patented Apr. 1, 1958

2,829,279

BI-STABLE MICROWAVE ABSORPTION CIRCUIT

Henry Doeleman, Montebello, Calif., assignor to Eldema Corporation, El Monte, Calif., a corporation of California Application November 19, 1956, Serial No. 622,988

16 Claims. (Cl. 307—88)

This invention relates to bi-stable circuits or circuit elements, of the type finding particular use in binary counters, and commonly known as "flip-flop" or "trigger" circuits. More particularly, the invention relates to such circuits utilizing electromagnetic energy in the microwave region, wherein resonant frequencies are determined by molecular absorption.

There exist a number of ways of producing an electric or electronic circuit having two stable states, in which the state of the circuit may be changed from one of the positions of stability to the other, generally by the application of some exterior influence such as that of a triggering pulse. A common and well-known example is the Eccles-Jordan circuit utilizing a pair of triodes with direct coupling of the output of the second stage with the input of the first stage. Trigger circuits can also be set up with the aid of magnetic amplifiers and with transistors. Other circuits are well known to those skilled in the art and may be found in suitable texts, particularly those on digital counters.

In spite of the considerable advances which have been made in trigger circuits in the last decade, there are a number of aspects in which improvement may be made. For example, systems using thermionic tubes suffer from finite tube life. In general, also, most of the trigger circuits available at the present time leave much to be desired in the maximum rate at which triggering can take place, and this limitation is more and more keenly felt as counting, control circuits, telemetering and other techniques are carried into regions where events are measured in microseconds.

It is an object of the present invention to provide a trigger circuit of a novel type, utilizing the phenomenon of microwave absorption by molecules, particularly gaseous molecules.

Another object of the present invention is to provide a trigger circuit which has substantially unlimited life even in continuous operation.

Another object of the present invention is to provide a trigger circuit capable of exceedingly high trigger pulse rates.

Another object of the invention is to provide a trigger circuit which can be readily adapted to miniaturization.

Other objects of the invention will appear as the description thereof proceeds.

Figure 1:
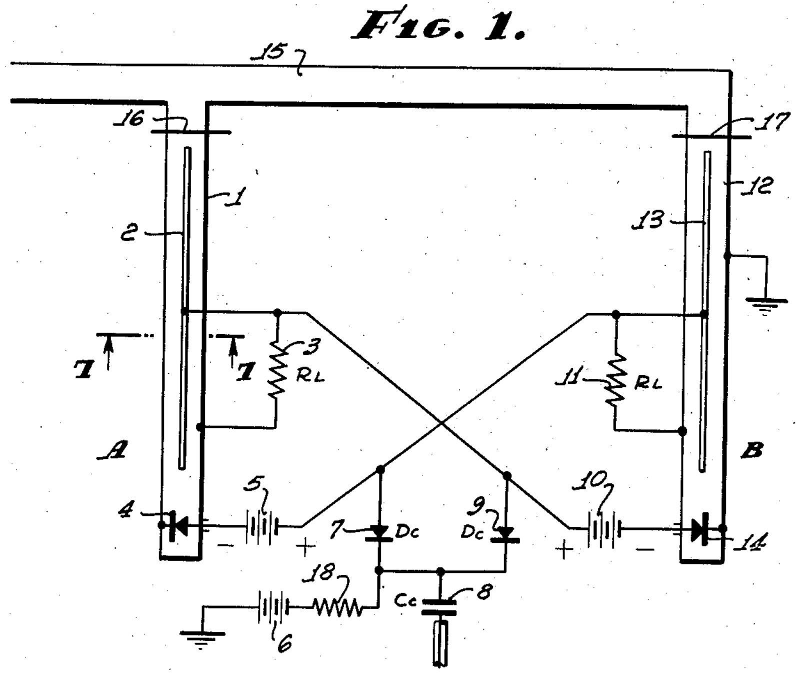
Fig. 1 shows a suitable circuit embodying the invention.

Generally speaking, and in accordance with the invention, my circuit will comprise two microwave elements, each fed from a common carrier source, each containing in some portion thereof a gas capable of absorbing electromagnetic energy in the microwave region used, each containing a means of varying the characteristic absorption of the gas contained in each element, each containing a detector responding to the electromagnetic energy present in that portion of the element wherein the detector is located, coupling means for bringing about interactions of the detector response from one element and the characteristic absorption frequency varying means on the other, and means associated with the aforementioned coupling means whereby the circuit can be triggered from one of its two stable states to the other.

The microwave elements will in general be sections of wave guide. They will be of varying lengths depending upon the particular circuit used, and they may be combined in various well-known fashions as is common in the art. In some of the circuits which I use, the wave guide sections comprising elements are combined in the form of a hybrid T junction, or "magic tee."

The two elements are coupled by wave guide sections to a common source of microwave output in the region chosen for operation. Such coupling is entirely conventional, and need not be described in further detail. In general, the elements are simply connected to a wave guide "header," that is, are fed in parallel from a common wave guide in turn fed by the power source.

The detectors which I use are those common in the art, and generally consist of a semi-conductor diode, such as a germanium or silicon diode, suitably placed within the wave guide system so as to respond to the microwave energy present therein. Detectors useful in my invention produce a voltage in response to the presence of microwave energy. Both germanium and silicon detectors are of this sort, and it will be understood that when the word "detector" is used hereinafter, such a type is meant, i. e., one yielding a voltage.

As mentioned, in selected portions of the wave guide system, I place a gas capable of absorbing energy in the microwave region used. I have found that the most generally useful gas is ammonia, $NH_3$, which has a particularly strong absorption in the 1¼ centimeter region at 23,870.1 megacycles. Other characteristic absorption frequencies of ammonia can be used, and a number of other gases may be used in place of ammonia, such as BrCN, ICN, COS, $CH_3OH$, $CH_3NH_2$, and $SO_2$. Where it is desired to confine the gas to selected portions of the microwave system, it may be isolated in a particular wave guide or section thereof by means of an electrically transparent window, such as mica, a thin pellicle of polystyrene, and the like, due regard being paid to the permeability of the window to the particular gas used. The pressure of the absorbing gas will generally be low, much lower than atmospheric pressure, and in some instances it will be desirable to evacuate the whole system except for the portion containing the gas, or in some cases to admit air to the remainder of the system so as to balance the pressure of the gas on the membrane so as to minimize leakage of the absorbing gas, particularly to other parts of the wave guide system where the absorbing gas should not be present.

Figure 7:
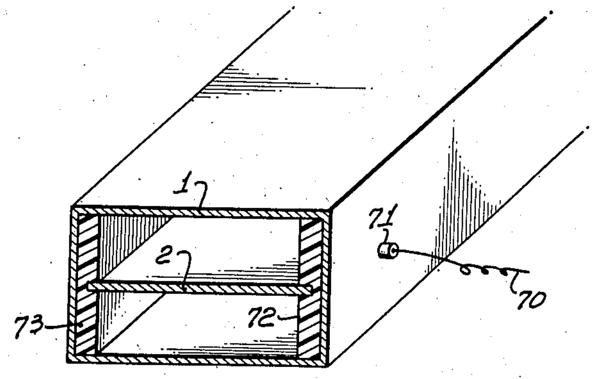
Fig. 7 is a section taken across a portion of Fig. 1, as shown by the dotted line thereon, showing the interior construction thereof.

The most generally satisfactory means which I use for varying the characteristic absorption frequency of the gas contained in the selected portion of the element is Stark modulation. This consists in impressing an electric field throughout a substantial portion of the region containing the absorbing gas, such as for example ammonia. As is well known, such a field produces a shift in the characteristic absorption frequency, the shift being generally in proportion to the intensity of the electrical field. In this instance, it is desirable to use structures giving as nearly as possible uniform electric field intensity throughout the region where the gas absorbs microwave energy. A satisfactory method of accomplishing this is by placing a plate within the selected portion of the wave guide, centrally located therein and parallel to the larger sides of the wave guide, and insulated therefrom by strips of insulating material at the walls. Suitable details are shown in Fig. 7, and a detailed discussion is given on pages 265–266 of the book "Microwave Spectroscopy," by C. H. Townes and A. L. Schawlow, New York, 1955, McGraw-Hill. A voltage is applied to the plate described, whereupon an electrical field is produced in that region of the wave guide, thus changing the characteristic absorption frequency of the gas contained therein.

The means which I employ to couple the detector output of one microwave element with the frequency varying means of the other, so as to produce a bi-stable circuit, may be most conveniently described in connection with the individual circuits themselves.

In the circuit shown in Fig. 1, 1 and 12 are each sections of wave guides, conveniently, for example, about a meter long, and each containing Stark modulation plates 2 and 13 respectively. The wave guide sections 1 and 12 receive microwave energy from a "header" wave guide 15. Each of the wave guide sections 1 and 12 is isolated mechanically and electrically from the header 15 by mica windows 16 and 17 respectively, placed at the flange joints. The wave guide sections 1 and 12 contain a suitable absorbing gas, such as ammonia, at a suitable pressure, such as 5 millimeters of mercury. Load resistors 3 and 11 shunt the Stark cell plates. The latter are connected to the output of the detectors 4 and 14 in the fashion shown in Fig. 1, with the interposition of bias voltage sources 5 and 10 respectively. Coupling diodes 7 and 9 are provided, connected as shown, and in parallel to a resistor 18, and additional bias voltage source 6.

The carrier frequency is adjusted to a value equal to one of the spectral absorption lines of the dielectric material used, for example, 23,870.1 megacycles for the 3,3 line of ammonia. The bias voltage sources 5 and 10 are adjusted to a value equal and opposite to the output of the detectors 4 and 14, when their output is high.

Figure 3:
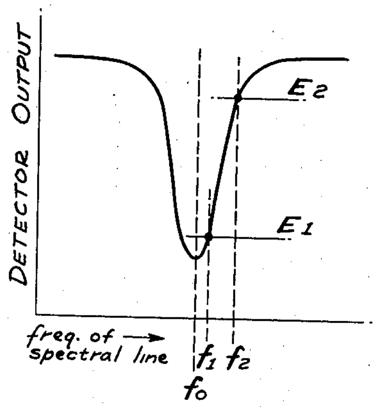
Figs. 3 and 4 show the voltage developed in the detector as a function of frequency for several conditions obtaining in the various circuits.

A typical response curve of the detector output is shown in Fig. 3. When no voltages are present and when the carrier is adjusted to the optimum frequency of the spectral line used, the detector output will be low. When a voltage is applied to one of the control electrodes 2 or 13, the frequency of that particular line is altered and the detector output goes to the high level, $E_2$ in Fig. 3.

When two circuit elements are used as a binary counter, they are so connected that the outputs of the detectors are applied to the control elements of the opposite cells, and are so phased that it is possible for only one element to be in a high state at any one time.

At the start of operation, and because of slight but inherent unbalance, both static and dynamic, between the two circuit elements, one or the other side will gain control and the combined circuit will stabilize. This is analogous to a vacuum tube bi-stable multivibrator or "flip-flop."

Referring to Fig. 1, assume that element 2 has a voltage present upon it. Then the ammonia will no longer absorb at 23,870.1 megacycles because of the Stark effect imposed, and the output of detector 4 will be high and equal to negative $E_2$. Bias voltage source 5 is adjusted to a value positive $E_2$. Since this bias voltage is in series with detector 4 the net total voltage appearing at control electrode 13 will equal zero. As stated above, and because of the spectral absorption characteristics of the dielectric material chosen, when there is no voltage present on the control element, the detector output will be low. When output of detector 14 is low, it does not cancel or balance out bias voltage from source 10. Hence the net total voltage applied to control electrode 2 will not be zero but will be approximately equal to the bias voltage $E_2$.

Now, if a negative trigger voltage is applied to both control electrodes simultaneously through coupling diodes 7 and 9, and if the diode inputs are initially biased to a positive voltage by a source 6, then, assuming a state of stability as developed in the above paragraph wherein control element 13, and hence the anode side of diode 7, is at zero potential, the input trigger pulse will cause no current to flow through diode 7. However, since the anode of diode 9 is at some positive voltage $E_2$, the trigger pulse will cause current to flow in it and will be applied to control electrode 2, forcing it to go in a negative direction. As control electrode 2 approaches zero, the output of diode 4 will decrease. This will allow voltage source 5 to increase the voltage on control electrode 13, which in turn causes output of diode 14 to increase. This increased voltage in series with source 10 will cause control electrode 2 to approach zero with the result that output of diode 4 will be low and the entire circuit will "lock" in this second stable state. The change back to the original stable state is accomplished by the next trigger pulse and can be explained in the same way except that the descriptions just given would apply to the opposite circuit elements.

Figure 2:
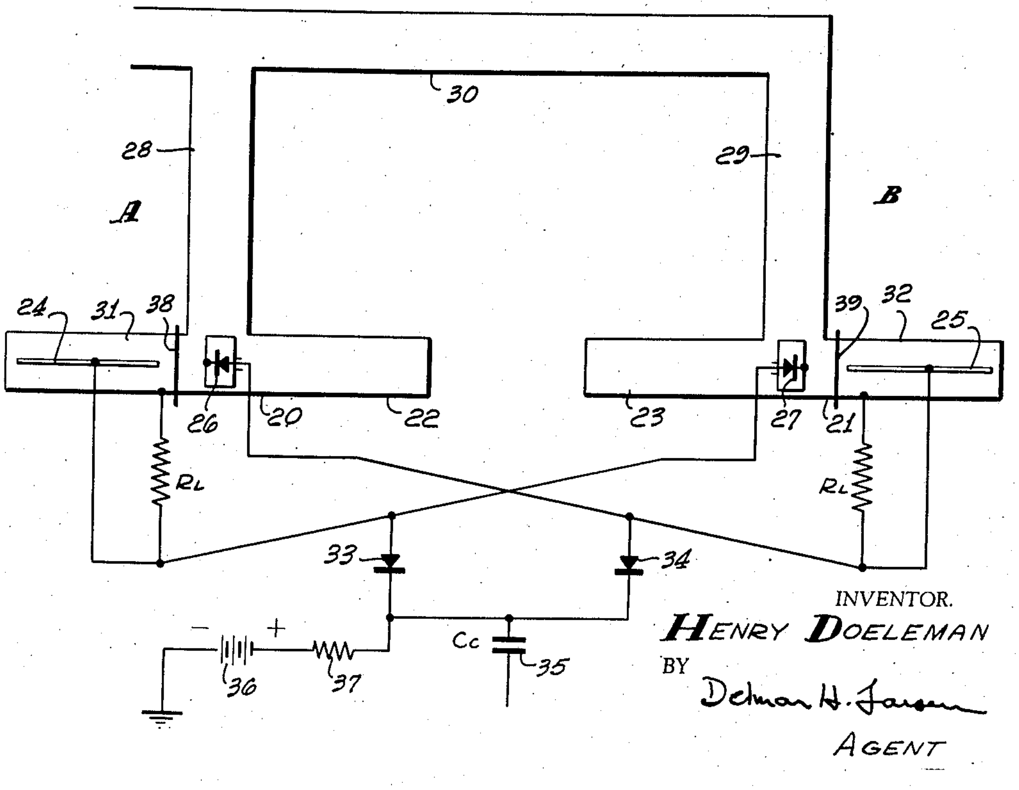
Fig. 2 shows an alternative circuit embodying the invention, using a hybrid T junction.

An alternative method of applying the principles of spectral line shift to a binary counter and one which affords good sensitivity to the frequency shift is shown in Fig. 2. In this arrangement, use is made of the high selectivity of the hybrid waveguide junction commonly called the magic tee. The hybrid junction is the wave guide equivalent of the four terminal pair hybrid coils having identical characteristic admittance at all four terminal pairs. A discussion of the magic tee is found at page 141 of the book "Radio Engineering" by F. E. Terman, Ed. 3, New York, McGraw-Hill, 1947.

A diagram of an arrangement using hybrid junctions is shown in Fig. 2. Each element is comprised of the junctions 20 and 21, a standard air dielectric shorted wave guide section 22 and 23 of length $x$ on one of each of the co-linear arms, a section of length $$x-\frac{\lambda g}{8}$$

each containing a control electrode 24 and 25, and filled with a suitable gas isolated by septa 38 and 39 and having the desired absorption frequency, these comprising the second co-linear arm 31 and 32, and a means for detecting the carrier signal, for instance a crystal diode 26 and 27 mounted on the series arm of such junction. The carrier voltage is fed to each junction 20 and 21 through the shunt arms 28 and 29, connected to a source header 30.

When a carrier voltage is fed to a hybrid junction having two such co-linear arms, identical except for the length relationship specified above, the signal reflected from the two arms is balanced out and no signal will reach the detector. If, however, the two arms are adjusted to a different length relationship, which also results in a different amplitude and phase relationship of the reflected voltages, then the voltages reflected from the two arms will not balance out and a signal will appear at the detector output. Now, if one of the air dielectric arms is replaced by one containing a control electrode and a gas or other dielectric, as for example a Stark cell filled with ammonia, then the reflection characteristics and, hence, the detector output response will be altered.

Figure 4:
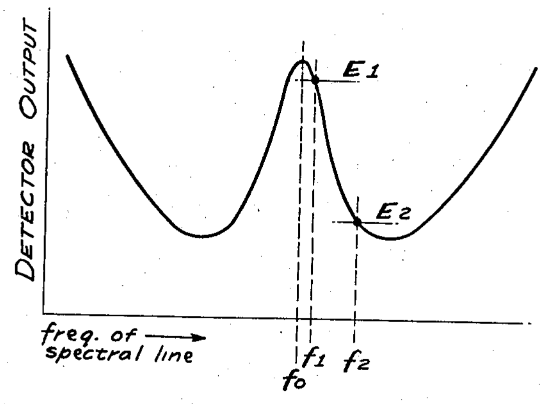

When the carrier frequency is adjusted to a value equal to the optimum frequency of the spectral absorption line of the dielectric in the control cell, and when there is no voltage present on the control electrode of the cell, then the detector output will appear as shown in Fig. 4.

In this figure, $f_0$ is the optimum absorption line frequency of the dielectric used, $f_1$ is the absorption frequency when a low voltage is present on the control electrode, and $f_2$ is the absorption frequency when a high voltage is applied to the control electrode.

To explain the operation of a binary "flip-flop" using two hybrid junction molecular resonance circuit elements, reference is again made to Fig. 2. When the device is placed in operation one or the other element will gain control due to inherent static and dynamic asymmetry between the two elements. Assume that the circuit has stabilized with a high voltage on control electrode 24. Then the balance of the co-linear arms 22 and 31 will be upset because the spectral line frequency will be shifted to $f_2$ in Fig. 4, and the detector 26 output will be low. Since detector 26 output is applied directly to control electrode 25 of the other element, that element will be operating at $f_1$ and the output of detector 27 will be high. This voltage is connected directly to control electrode 24 which must be high to maintain the condition just described. Thus, the circuit will stabilize itself in the first of two stable states.

Now, if a negative trigger voltage is applied through isolating capacitor 35 to both control electrodes simultaneously through coupling diodes 33 and 34, and assuming a state of stability developed as described hereinabove, wherein the control electrode 25 and hence the anode of diode 34 is at a low voltage level, then the input trigger pulse will cause no current to flow in diode 34. However, since the anode of diode 33 is at some high voltage level $E_1$, the trigger pulse will cause current to flow in it and will be applied to control electrode 24, forcing it to go down or in a negative direction. As control electrode 24 approaches a low level, the output of diode detector 26 will increase. Since this diode is directly connected to control electrode 25, the detector 27 will go to a low value and hold electrode 24 down to a low voltage. This provides the necessary condition for the circuit to stabilize in its second stable state. Thus the arrangement will function as a binary counter "flip-flop." Additional bias voltage source 36 and resistor 37 are essentially as has been described in connection with Fig. 1.

Figure 5:
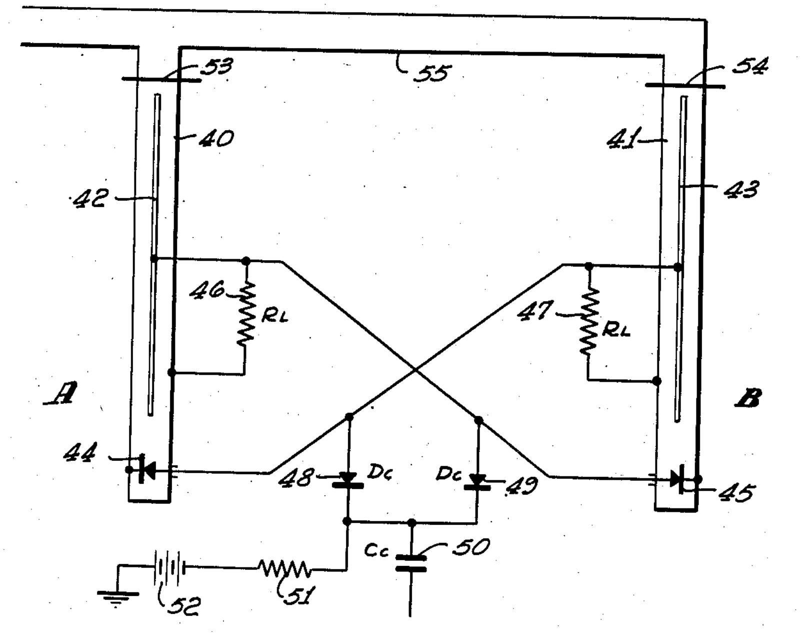
Figs. 5 and 6 show additional circuits embodying the invention.

A further alternative method may be used wherein the R. F. carrier frequency is adjusted to a value other than the optimum spectral line frequency so that, upon application of a signal voltage to the control electrode, the spectral line frequency is made to coincide with that of the R. F. carrier. Thus, when the signal is applied to the control electrode, absorption of the carrier occurs, and the detector output signal will be low. This provides the 180° phase shift necessary for binary "flip-flop" operation of the two interconnected molecular resonance circuit elements. An arrangement using this approach is shown in Fig. 5.

In this latter arrangement, means for initially biasing the control circuits becomes unnecessary. However, it is somewhat more critical as to construction and adjustment due to the requirement of shifting the spectral line precisely into resonance with the line.

Referring again to Fig. 5, the general arrangement is somewhat similar to Fig. 1, in that wave guide sections 40 and 41 are provided, each containing Stark modulating plates 42 and 43 and detectors 44 and 45. The gas, such as ammonia, is retained in these guide sections by septa or membranes 53 and 57 made of mica. Load resistors 46 and 47 are provided, as are also diodes 48 and 49, a single bias voltage source 52, a resistor 51, and a trigger input isolating capacitor 58. The operation of Fig. 5 is as follows: the frequency of the microwave energy applied through wave guide header 55 is slightly different from that of the absorption frequency of the gas used, for example ammonia, under conditions of no applied electrical field. However, application of a proper voltage to the Stark plates 42 and 43 will change the characteristic absorption frequency of the gas so that it coincides with that of the R. F. carrier. When no voltage is applied to either Stark electrode, the gas does not absorb the microwave energy so that as a result the output of the detector is "high." For reasons which become clear as the description proceeds, in the absence of any trigger pulse, one element or the other will be in a "high" state. In order to consider the operation of this circuit, we may assume that the left hand element of Fig. 5 is in that state. Accordingly, microwave energy will traverse wave guide 40 with relatively little absorption, and the voltage produced at detector 44 will be substantial. This will hold Stark electrode 43 at the voltage necessary to bring the gas in wave guide 41 into the same resonant frequency as that of the carrier, so that the gas in the wave guide 41 will absorb the radiation substantially more than it is absorbed in wave guide 40 and the output of the detector will be low. This state of affairs can be reversed, with a "flip-flop" action, by application of a trigger pulse through condenser 50 exactly as has been described in connection with Fig. 1.

Figure 6:
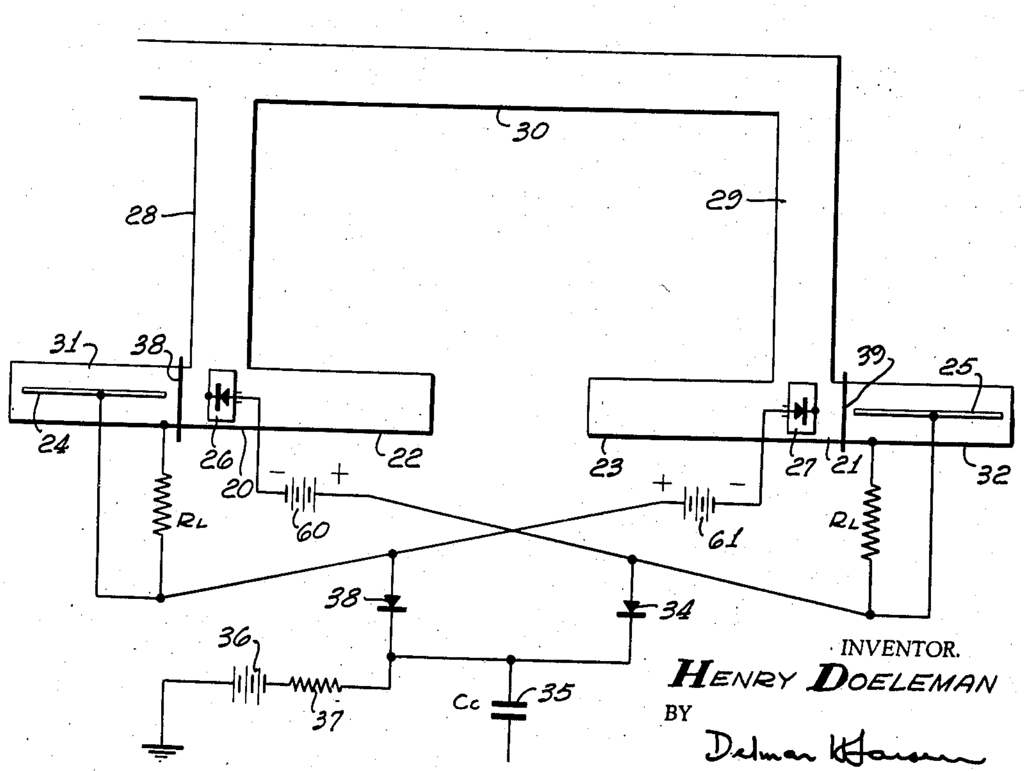

A further alternative method is to use the arrangement described in connection with Fig. 2 except including bias voltage sources as shown in Fig. 6. In this arrangement, the carrier frequency is adjusted to some value other than the optimum spectral line frequency so that, upon application of a signal voltage to the control electrode of a particular element, the line frequency is shifted to coincide with that to which the hybrid junction co-linear arms are adjusted. Under these conditions of operation, the output of the detector will go down as the control electrode voltage goes up and the required 180° phase shift necessary for binary "flip-flop" operation is realized.

Fig. 6 shows one arrangement for such a circuit. Constituent elements of the circuit which are identical with those in Fig. 2 have been given the same reference numbers, and it will be understood that the description of these items set forth hereinabove in connection with Fig. 2 likewise will apply to the circuit of Fig. 6. Here, considering as was done in connection with Fig. 5, that the left hand element is in a "high" state, the Stark control plate 24 will be at a reduced voltage, so that the two co-linear arms 31 and 22 are not balanced, and the difference energy will be available to produce a voltage at detector 26. This voltage, algebraically combined with the bias voltage provided by bias voltage source 60, maintains the voltage of Stark control plate 25 in the right hand element at a sufficient difference in potential from that of the wave guide 32 that the two co-linear arms of junction 21 are brought into balance, so that as a consequence no voltage is produced at the right hand detector 27, which is coupled to left hand Stark control plate 24 through bias voltage source 61. Exactly as has been described in connection with the previous circuits, application of a trigger pulse through condenser 35 will cause the circuit to trigger, whereupon hybrid junction 21 is therefore in a "high" state and hybrid junction 20 is in a "low" state.

A wide variety of means may be employed to show or otherwise register which of the elements in my inventive circuit is in a "high" state, so that the circuit can be applied to such tasks as counting and the like. Such methods are so clear to one skilled in the art that detailed description is not believed necessary. For example, when one element is in a high state, a voltage will be developed across the load resistor associated with that element, in the case of the circuits of Figs. 1 and 2, and across the load resistor of the other element in the case of the "off peak" method as has been described in connection with the circuits of Figs. 5 and 6. This voltage can be registered, fed to other circuits and the like, by means well known in the art.

As mentioned, the Stark cell is of the type of construction usual in Stark modulation spectrographs, as described for example by the Townes book cited. The construction of the Stark control plate portion of the wave guides may conveniently be the same as all of the circuits which have been described herein and for which the construction shown in Fig. 7 is typical. In Fig. 7, 1 is the wave guide, 2 is the Stark plate, 70 is a lead to the Stark plate whereby voltages can be fed thereto, 71 is an insulating bushing, conveniently of polystyrene, which should form a hermetic seal so as to avoid loss of ammonia or other gas in the wave guide, and 72 and 73 are strips of insulating material which serve both to support the Stark plate 2 in a proper portion centrally within the wave guide and also to insulate the plate electrically from the walls thereof. Again, polystyrene or one of the polyfluoroethylene polymers is suitable.

While a number of specific embodiments have been described, it will be appreciated that the invention is a broad one, and it is to be understood that the invention is capable of a number of modifications, within the scope of the description and the claims appended hereto.

What I claim is:

1. A bi-stable circuit comprising: a first microwave element, a second microwave element, a common carrier source, connection means from each of said elements to said common carrier source, a microwave energy detector of the voltage output type in each of said elements, a characteristic absorption frequency varying means in each of said microwave elements responsive to voltage impressed thereon, and interposed between said detector and said source, a gas capable of absorbing microwave energy in the portion of each of said microwave elements containing said characteristic absorption frequency varying means, coupling means from the detector of said first element to the characteristic absorption frequency varying means of said second element, coupling means from the detector of said second element to the characteristic absorption frequency varying means of said first element, and means associated with said coupling means for injecting a voltage pulse into said coupling means.

2. A bi-stable circuit comprising: a first microwave element, a second microwave element, a common carrier source, connection means from each of said elements to said common carrier source, a microwave energy detector of the voltage output type in each of said elements, a Stark plate in each of said microwave elements, and interposed between said detector and said source, a gas capable of absorbing microwave energy in the portion of each of said microwave elements containing said Stark plate, coupling means from the detector of said first element to the Stark plate of said second element, coupling means from the detector of said second element to the Stark plate of said first element, and means associated with said coupling means for injecting a voltage pulse into said coupling means.

3. A bi-stable circuit comprising: a first microwave element, a second microwave element, a common carrier source, connection means from each of said elements to said common carrier source, a microwave energy detector of the voltage output type in each of said elements, a characteristic absorption frequency varying means in each of said microwave elements responsive to voltage impressed thereon, and interposed between said detector and said source, a gas capable of absorbing microwave energy in the portion of each of said microwave elements containing said characteristic absorption frequency varying means, a first bias voltage source, a connection from a detector of said first element to the characteristic absorption frequency varying means of said second element and including said first bias voltage source therein, a second bias voltage source, a connection from a detector of said second element to the characteristic absorption frequency varying means of said first element and including said second bias voltage source, and means associated with said coupling means for injecting a voltage pulse into said coupling means.

4. A bi-stable circuit comprising: a first microwave element, a second microwave element, a common carrier source, connection means from each of said elements to said common carrier source, a microwave energy detector of the voltage output type in each of said elements, a characteristic absorption frequency varying means in each of said microwave elements responsive to voltage impressed thereon, and interposed between said detector and said source, a gas capable of absorbing microwave energy in the portion of each of said microwave elements containing said characteristic absorption frequency varying means, a first bias voltage source, a connection from the detector of said first element to the characteristic absorption frequency varying means of said second element and including said first bias voltage source therein, a second bias voltage source, a connection from the detector of said second element to the characteristic absorption frequency varying means of said first element and including said second bias voltage source, a trigger input blocking capacitor, first and second blocking diodes, each connected respectively to each of said characteristic absorption frequency varying means, and each of said diodes connected to said trigger input blocking capacitor, a third bias voltage source, and connection means from said trigger input blocking capacitor to microwave element ground including said third bias voltage source.

5. A bi-stable circuit comprising: a first microwave element, a second microwave element, a common carrier source, connection means from each of said elements to said common carrier source, a microwave energy detector of the voltage output type in each of said elements, a Stark plate in each of said microwave elements and interposed between said detector and said source, a gas capable of absorbing microwave energy in the portion of each of said microwave elements containing said Stark plate, a first bias voltage source, a connection from the detector of said first element to the Stark plate of said second element and including said first bias voltage source therein, a second bias voltage source, a connection from the detector of said second element to the Stark plate of said first element and including said second bias voltage source, a trigger input blocking capacitor, first and second blocking diodes, each connected respectively to each said Stark plate, and each connected to said trigger input blocking capacitor, a third bias voltage source, and connection means from said trigger input blocking capacitor to microwave element ground including said third bias voltage source.

6. A bi-stable circuit comprising: a first hybrid microwave T junction, a second microwave T junction, both having series and shunt arms, a common carrier source, connection means from each of said junctions to said common carrier source, microwave energy detectors of the voltage output type in an end of a series arm of each of said junctions, characteristic absorption frequency varying means in one shunt arm of each of said junctions responsive to voltage impressed thereon, a gas capable of absorbing microwave energy in the arm of each of said junctions containing said characteristic absorption frequency varying means, coupling means from the detector of said first junction to the characteristic absorption frequency varying means of said second junction, coupling means from the detector of said second junction to the characteristic absorption frequency varying means of said first junction, and means associated with said coupling means for injecting a voltage pulse into said coupling means.

7. A bi-stable circuit comprising: a first hybrid microwave T junction and a second microwave T junction, both having series and shunt arms, a common carrier source, connection means from each of said junctions to said common carrier source, microwave energy detectors of the voltage output type in an end of a series arm of each of said junctions, a Stark plate in one shunt arm of each of said junctions, a gas capable of absorbing microwave energy in the arm of each of said junctions containing said Stark plate, coupling means from the detector of said first junction to the Stark plate of said second junction, coupling means from the detector of said second junction, to the Stark plate of said first junction, and means associated with said coupling means for injecting a voltage pulse into said coupling means.

8. A bi-stable circuit comprising: a first hybrid microwave T junction and a second microwave T junction, both having series and shunt arms, a common carrier source, connection means from each of said junctions to said common carrier source, microwave energy detectors of the voltage output type in an end of a series arm of each of said junctions, a gas capable of absorbing microwave energy in the arm of each of said junctions containing said Stark plate, a first bias voltage source, a connection from the detector of said first junction to the Stark plate of said second junction and including said bias voltage source therein, a second bias voltage source, a connection from the detector of said second junction to the Stark plate of said first junction and including said second bias voltage source, a trigger input blocking capacitor, first and second blocking diodes, each connected respectively to each said Stark plate and each connected to said trigger input blocking capacitor, a third bias voltage source, and connection means from said trigger input blocking capacitor to hybrid junction ground including said third bias voltage source.

9. The circuit of claim 1 wherein the gas is ammonia.

10. The circuit of claim 2 wherein the gas is ammonia.

11. The circuit of claim 3 wherein the gas is ammonia.

12. The circuit of claim 4 wherein the gas is ammonia.

13. The circuit of claim 5 wherein the gas is ammonia.

14. The circuit of claim 6 wherein the gas is ammonia.

15. The circuit of claim 7 wherein the gas is ammonia.

16. The circuit of claim 8 wherein the gas is ammonia.

No references cited.